United States Patent [19]

Pernick et al.

[11] Patent Number: 5,129,041
[45] Date of Patent: Jul. 7, 1992

[54] OPTICAL NEURAL NETWORK PROCESSING ELEMENT WITH MULTIPLE HOLOGRAPHIC ELEMENT INTERCONNECTS

[75] Inventors: Benjamin J. Pernick, Forest Hills; Kenneth G. Leib, Wantagh; Robert W. Brandstetter, Levittown, all of N.Y.

[73] Assignee: Grumman Aerospace Corporation, Bethpage, N.Y.

[21] Appl. No.: 535,152

[22] Filed: Jun. 8, 1990

[51] Int. Cl.[5] ............................................. G06F 15/18
[52] U.S. Cl. ...................................... 395/25; 364/822; 359/11; 359/20; 359/107
[58] Field of Search ............... 364/513, 807, 822, 841; 350/3.68; 395/25

[56] References Cited

U.S. PATENT DOCUMENTS

| 3,779,492 | 12/1973 | Grumet | 356/71 |
|---|---|---|---|
| 3,993,400 | 11/1976 | Leib | 350/96 C |
| 4,206,979 | 6/1980 | Jost | 350/342 |
| 4,447,111 | 5/1984 | Leib | 350/320 |
| 4,522,466 | 6/1985 | Lindig et al. | 350/162.12 |
| 4,645,300 | 2/1987 | Brandstetter et al. | 350/162.12 |
| 4,771,397 | 9/1988 | Brandstetter et al. | 364/807 |
| 4,771,398 | 9/1988 | Brandstetter et al. | 364/807 |
| 4,815,027 | 3/1989 | Tokumitsu et al. | 364/841 |
| 4,976,520 | 12/1990 | Brandstetter et al. | 350/384 |
| 5,004,309 | 4/1991 | Culfield et al. | 364/822 |
| 5,005,946 | 4/1991 | Brandstetter | 350/162.12 |

OTHER PUBLICATIONS

P. Yeh et al., "Photorefractive nonlinear optics and optical computing," *Optical Engineering*, vol. 28, No. 4, pp. 328-343, Apr. 1989.

E. Bradley et al., "System issues relating to laser diode requirements for VLSI holographic optical interconnects," *Optical Engineering*, vol. 28, No. 3, pp. 201-211, Mar. 1989.

F. B. McCormick, "Generation of large spot arrays from a single laser beam by multiple imaging with binary phase gratings," *Optical Engineering*, vol. 28, No. 4, pp. 299-304, Apr. 1989.

*Primary Examiner*—Allen R. MacDonald
*Attorney, Agent, or Firm*—Bacon & Thomas

[57] ABSTRACT

A neural network processing element uses primarily optical components to model a biological neuron having both spatial and temporal dependence. The neural network processing element includes a switch-controlled laser source, a multiple holographic lens, a spatial/temporal light modulator, and a photodetector array. Laser beam control may be optical, electrical or acoustical, or a combination of these.

30 Claims, 6 Drawing Sheets

OPTICAL NEURAL NETWORK PROCESSING ELEMENT WITH MULTIPLE HOLOGRAPHIC ELEMENT INTERCONNECTS

BACKGROUND OF THE INVENTION

1. Field of the Invention

The present invention relates generally to neural networks of the type generally suitable for pattern recognition, robotic control and optical correlation; and, more particularly, to individual processing elements that comprise such neural networks.

2. Description of the Related Art

Figure 1A:
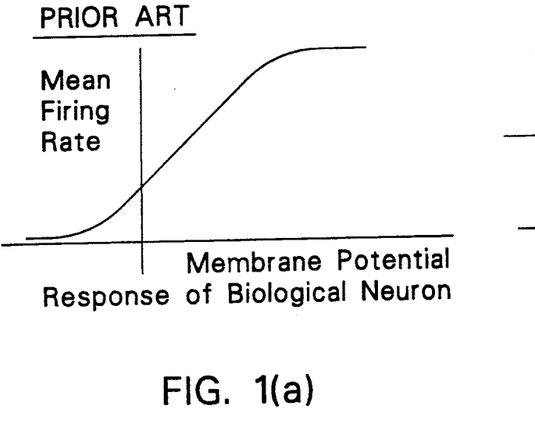
FIG. 1a illustrates graphically the response of a biological neuron as a plot of mean firing rate versus membrane potential.

Synaptic coupling between neurons in biological neural networks gives rise to variable states of neuron activity resulting in some being turned on (firing), some turned off (not firing), and others in transition. These transitions occur in a nonlinear fashion described by a sigmoid transfer curve, which is shown in FIG. 1(a). That figure shows a plot of mean neuron firing output versus input potential to the neuron (membrane potential).

Figure 1B:
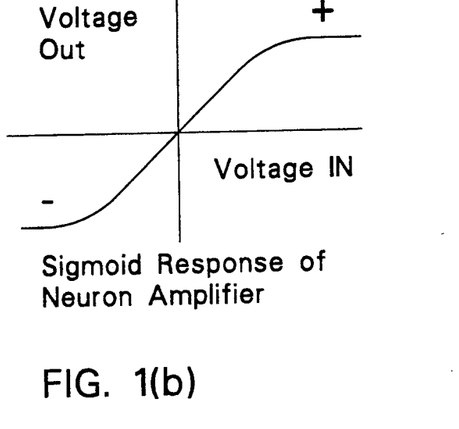

In the Hopfield electrical model of a biological neural network described in "Neural Networks and Physical Systems with Emergent Collective Computational Abilities," *Proc. Nat. Acad. Sci. U.S.A.*, Vol. 79 (1982) pp. 2554-2558, and in "Computing with Neural Circuits: A Model," *Science* 233, (1986) pp. 625-633, each neuron is represented by an amplifier which has a sigmoid voltage transfer curve (see FIG. 1(b)). For this model, the cutoff or negative output of the amplifier is analogous to the neuron not firing, with full turn on of the amplifier corresponding to maximum firing rate.

While this model has proven to be quite effective in approximating the biological neuron response, the voltage conditions of the model remove temporal dependence from the model.

SUMMARY OF THE INVENTION

The present invention provides the capability for temporal as well as spatial dependence, permitting a more versatile and complete model of the biological neural network. As such, the invention comprises an optical neural network processing element incorporating a multiple holographic lens for producing a custom light beam array from one or more input light beams controlled by one of a variety of switch means, a modulation means for spatially and temporally modulating the array output from the multiple holographic lens, and a photodetector array designed to receive and convert the optical output of the modulation means into electrical signals corresponding to the information encoded in the modulated array.

The multiple holographic lens and modulator are used as weighted interconnects in a variety of light modulation schemes to control the "neuron" in the neural network. The light modulation schemes include modulation of magnitude, phase, polarization, or some combination of these using an electrooptic or acoustooptic beam controller; a Fabry-Perot interferometer beam controller; or a Michelson or Mach Zehnder interferometer beam controller. In each of these modulation schemes, the light beam array input to the multiple holographic lens is controlled by the particular controlling scheme.

An optical configuration for the neural network thus provides large capacity, high switching speeds, large interconnect capability, and controlled-weight variables for adaptive network structures, all at very high operating speeds.

BRIEF DESCRIPTION OF THE DRAWINGS

FIG. 1b illustrates graphically the sigmoid response of a prior art neuron amplifier as a plot of voltage out versus voltage in;

DETAILED DESCRIPTION OF THE PREFERRED EMBODIMENTS

Figure 2:
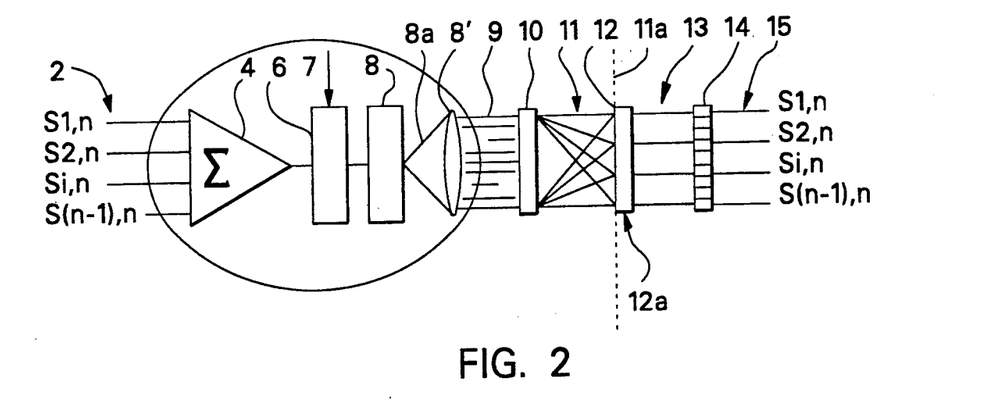
FIG. 2 shows a basic neuron response element combined with a multiple holographic lens as an optical interconnect according to the teachings of the present invention.

FIG. 2 illustrates in schematic fashion the use of a multiple holographic lens interconnect for a neural network processing element.

Input signals 2 are summed at optical summing means 4, which outputs a signal to beam controller 6 which, as described in greater detail below, controls the output of laser beam source 8. As shown in FIG. 2, an array of input signals 2 is collectively summed at 4 with associated weighting functions, if needed. When the summation output satisfies a threshold condition, beam controller 6 is activated. Alternatively, beam controller 6 may be a photoreceptive device, in which case switching action may be controlled using light-addressed means. Components 4, 6 and 8, along with collimating lens 8', collectively may be termed a neural response element.

In FIG. 2, multiple holographic lens 10 functions as an interconnect array. Illuminating the multiple holographic lens with laser beam 9 results in the generation of a plurality of beams 11. The number of individual beams generated by the multiple holographic lens is predetermined by the requirements of the application at hand. The geometric properties of beams 11 (i.e., collimation, focal length, angular direction) are established during construction of the multiple holographic lens.

In this regard, reference is made to Grumet U.S. Pat. No. 3,779,492, patented Dec. 18, 1973 and assigned to the present Assignee. The Grumet patent discloses an automatic target recognition system including a multiple holographic lens that may be utilized in the present invention. The content of the Grumet patent is hereby incorporated by reference.

Modulation of each individual reconstructed beam may be accomplished by inserting an appropriate modulator 12 at the plane of focus 11a beyond multiple holographic lens 10 where the individual beams 11 are well separated.

The function of spatial/temporal modulator 12 is to alter properties of each individual beam 11 transmitted (or reflected, if so designed) through a corresponding element of modulator 12. Modulator 12 may be electrically or optically addressed at 12a. An exiting beam 13 can emerge altered in amplitude, polarization state, or both after being acted upon by an addressed element of modulator 12. If the polarization state of exiting beam 13 is altered by a modulator element, a polarization analyzer is preferably placed after modulator 12 to modify the amplitude of the particular beam 13.

After passage through modulator 12, a photodetector array 14 is preferably used to measure light level in the modulated beams 13. Individual detector elements are preferably in one-to-one correspondence with individual modulated beams 13. The electrical output 15 from each individual detector element in array 14 may then be used as an input signal to other neural network processing elements in the overall network architecture.

Figure 3:
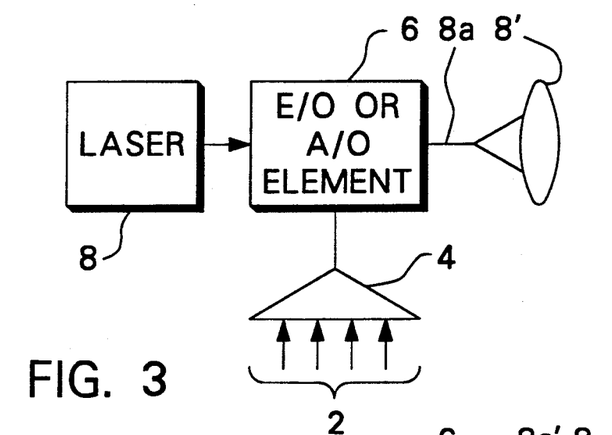
FIG. 3 shows an electronically driven electrooptic or acoustooptic component as modulating a light beam array input to a multiple holographic lens.
Figure 4:
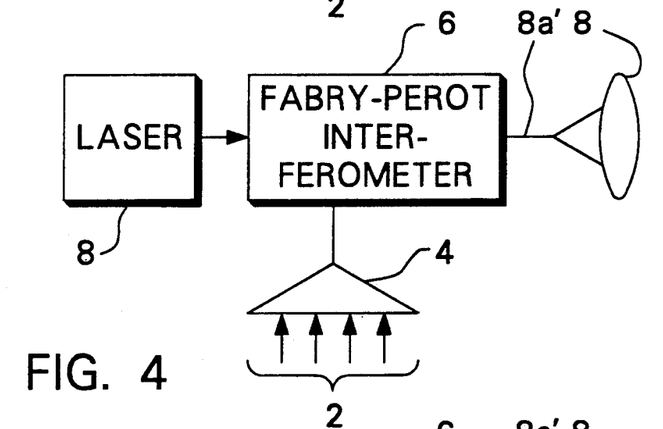
FIG. 4 illustrates the use of a Fabry-Perot interferometer arrangement for laser beam control.
Figure 5:
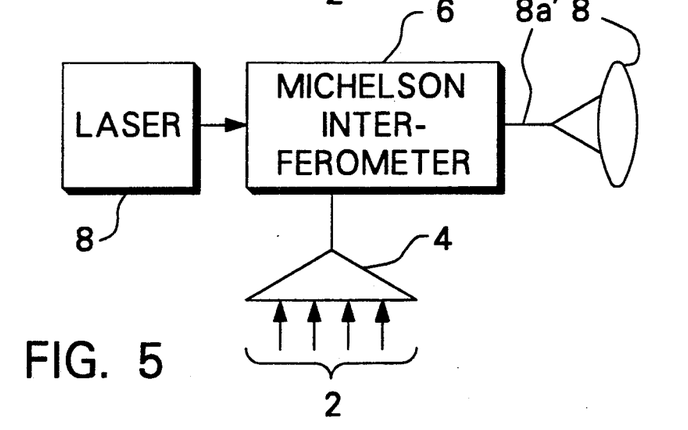
FIG. 5 illustrates the use of a Michelson or Mach Zehnder interferometer for laser beam control.

To describe the various aspects of the invention in greater detail, reference is next made to FIGS. 3-5.

Control of the input laser may be achieved using various embodiments of beam controller 6. As described above, this component operates the laser output 9 in a binary fashion, i.e. on-off action, under the control of the output of summer 4. Alternatively, the laser output 9 may be controlled in a continuous fashion, its output characteristic being functionally related to the input from summer 4. Several means for implementing continuous laser beam control are shown in FIGS. 3-5.

In FIG. 3, beam controller 6 may comprise an electrooptic or acoustooptic component that is electronically driven to control the nature of transmitted laser beam 8a. The operating characteristics of these devices are well known. Modulation of the laser beam could be in the form of magnitude, phase or polarization change, or some combination of these.

FIG. 4 illustrates another configuration of beam controller 6 for control of laser beam 8a. Beam controller 6 is a means for modulating a Fabry-Perot interferometer arranged at the output of laser source 8. To construct the arrangement, an electrooptic material is placed between the two end mirrors of a Fabry-Perot interferometer. The optical index of refraction of the electrooptic material can be varied in accordance with an applied voltage signal from signal summer 4. Since certain materials are photorefractive, the means to control the laser beam output can also be achieved by illuminating the material with an appropriate light beam instead of an electric drive. This alternative means for optical control of a Fabry-Perot interferometer is known to yield a bistable response (i.e., the magnitude of input light intensity yields two stable output levels). The FIG. 3 arrangement can similarly utilize such an optical means.

A further configuration for beam controller 6 is shown in FIG. 5. Here, the means to achieve control of laser beam 9 is accomplished using another interferometer setup, such as the well-known Michelson and Mach Zehnder interferometers. In one mode of operation, an electrical output from summer 4 can translate the end mirror in a conventional manner, causing a fringe pattern appearing on the output beam 9 to vary in accordance with the mirror displacement in a known manner. The output laser beam 9 would then be modulated in intensity.

By thus introducing an electrooptic or photorefractive material into the interferometer, control of the output beam 9 can be done electrically without extensive moving parts or by driving the unit with a light beam.

Figure 6:
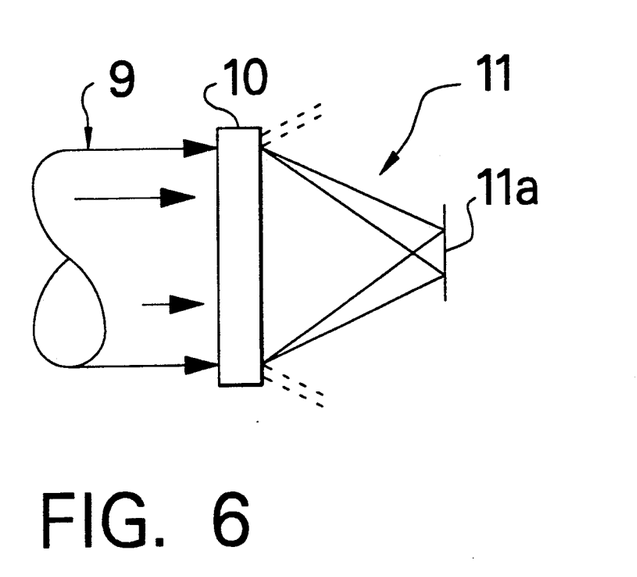
FIG. 6 illustrates the use of a multiple holographic lens as an optical interconnect component.

Referring next to FIG. 6, the use of a multiple holographic lens as an optical interconnect component is illustrated. A single laser beam 9, incident on multiple holographic lens 10, generates an array of beams 11, as is well known, for example, from the aforementioned Grumet patent. Commonly, illuminating beam 9 is an expanded collimated beam created from a narrow beam width exiting a laser source and expanded by well-known optical means, for example, a lens-pinhole combination. This so-called reconstruction beam, however, can be either a collimated, converging or diverging beam. The width and shape of beam 9 impinging on multiple holographic lens interconnect 10 is determined by the desired size of multiple holographic lens 10.

As stated previously, properties of the array of reconstructed beams are established when multiple holographic lens 10 is fabricated. Beams 11 are termed "reconstructed" because they represent reconstructions of the beams used in constructing multiple holographic lens 10. These properties are the shape of each individual beam in the array (converging, collimated or diverging); the spacings between individual beams; and their directions. The separate beams in array 11 shown in FIG. 3 are represented as converging, spherical wavefronts that come to a focus at plane 11a a distance from multiple holographic lens interconnect 10. One practical advantage of this geometry is the ability to concentrate the energy in each beam over a small region in the plane of sharper focus 11a. This permits one to compact the array of focused beams over a small area of spatial/temporal modulator 12 in the plane of focus 11a.

Figure 7:
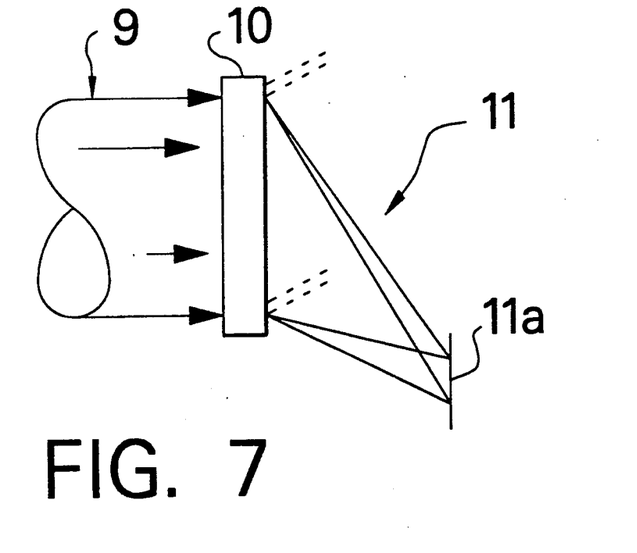
FIG. 7 illustrates a second multiple holographic lens reconstruction geometry.

FIG. 7 presents another multiple holographic lens reconstruction geometry. Here, the reconstructed laser beam array 11 is directed at an angle with respect to the direction of incident beam 9. This is a practical arrangement since there is always some level of laser light that transmits through the multiple holographic lens, but does not form part of the converging beam array. These rays are shown schematically in both FIGS. 6 and 7 as dashed lines.

In the arrangement previously shown in FIG. 6, these extraneous light beams add unwanted contributions to the light distribution in the plane of sharper focus 11a of converging array 11. In the setup shown in FIG. 7, spatial/temporal modulator 12 would be best located in the region of focused beams 11, at an angle with respect to the direction of illuminating beam 9.

Since the reconstructed beams 11 may be so directed by changing their wavelengths, an additional consideration when designing the multiple holographic lens is the illuminating wavelength to be used. The same multiple holographic lens will focus an output beam of wavelength $\lambda_1$ at a different plane than it would a beam of wavelength $\lambda_0$. This new array of focused spots occurs at a different offset angle $\alpha$ than that of original wavelength $\lambda_0$. The relationship between offset angle and focal plane shifts is as follows:

$$\frac{\sin \alpha_0}{\sin \alpha_1} = \frac{\lambda_0}{\lambda_1} \text{ and } F_0 = F_1 \lambda_0/\lambda_1$$

where $F_0$, $F_1$ represent the focal lengths of the multiple holographic lens at wavelengths $\lambda_0$, $\lambda_1$ respectively. These formulations apply to the multiple holographic lens so that a multiple address capability can be brought about by wavelength shifting.

Additionally, the multiple holographic lens can be made achromatic if the application warrants a constant interconnect, but must accommodate a variety of wavelengths.

The spatial/temporal modulator 12 is preferably a two-dimensional array of modulator elements. Each modulator element may be represented illustratively as having a rectangular pixel-like shape. Individual output beams of the multiple holographic lens interconnect are in one-to-one correspondence with each element of modulator 12. This modulator geometry is exemplary; and may change for a given application.

Where the modulation is desired to be constant in time, a simple attenuator (for example, a neutral density filter or a polarization analyzer) could be used. Of greater versatility would be a means to modulate temporally each individual multiple holographic lens-derived beam, which could be accomplished using any device capable of imposing a controlled spatial modulation on the light beams.

The spatial light modulator set forth illustratively in Jost U.S. Pat. No. 4,206,979, patented Jun. 10, 1980, and assigned to the present Assignee, is one such device. It may be driven electrically in a two-dimensional format, or optically addressed. As applied in the present invention, the modulation characteristics, both temporal and spatial, may consist of magnitude modulation, phase modulation, or both. The content of the Jost patent is hereby incorporated by reference.

Figure 8:
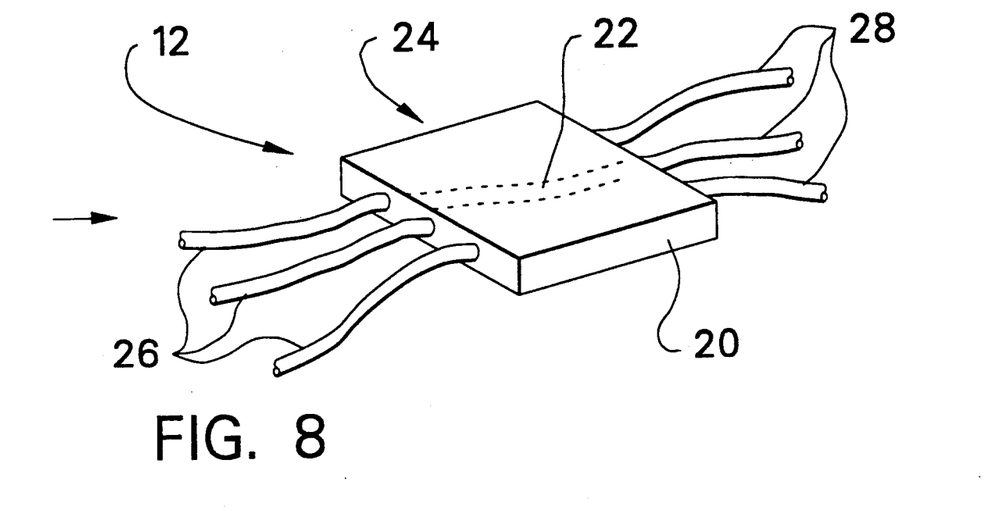
FIG. 8 shows a laser-defined liquid crystal embodiment of a light modulator useful in the inventive neural network processing element.

With reference to Leib U.S. Pat. No. 3,993,400 (assigned to the present assignee and hereby incorporated by reference), another possible configuration for modulator 12 is illustrated in FIG. 8. This embodiment consists of a contained thin film 20 of liquid crystal material whose light-conducting path 22 can be formed by an intense laser beam 24 of small cross section. By some external address command controlling the position of laser beam 24, conducting channel 22 can be formed so that an input 26 from an optical fiber can be directed toward output channel 28. Both the optical fibers and the thickness of film 20 are of the order of 10-15 micrometers. The optical fibers can be replaced by the focused beams from multiple holographic lens 10.

Figure 9:
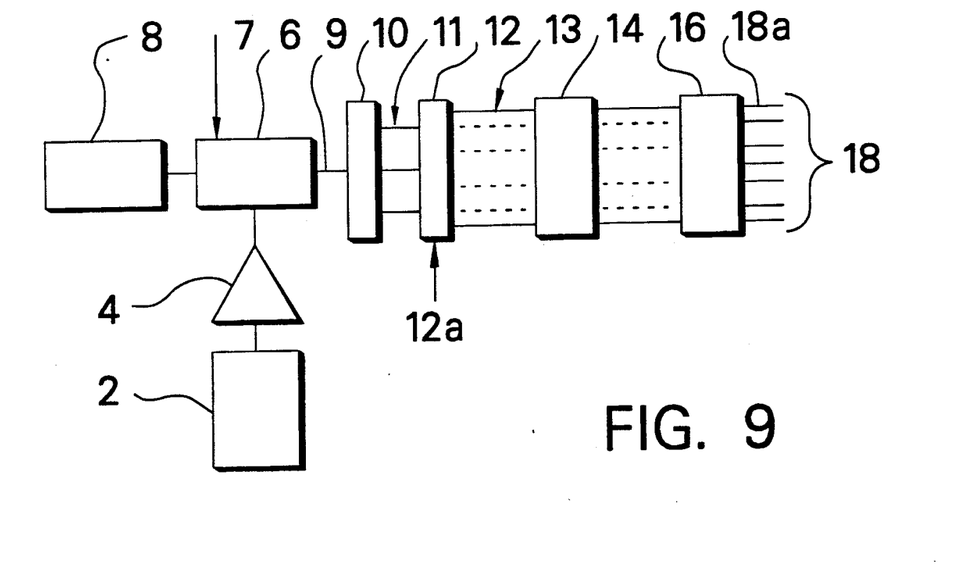
FIG. 9 shows one implementation of an inventive optical neural network processing element for driving a laser diode array in a primarily optical configuration.

FIG. 9 illustrates a primarily optical implementation of the invention. Detector array 14 is used to drive a corresponding array of laser diodes or light-emitting diodes 16. An individual detector element senses the light intensity of one of the light beams exiting modulator 12. The output of the detector element drives a corresponding laser diode or light-emitting diode. A coherent optical fiber bundle 18 is coupled at its input end to the laser diode or light-emitting diode array 16 so that the light output from the particular detector element/diode combination is coupled to one individual optical fiber 18a in the coherent optical fiber bundle 18. Thus, the coherent optical fiber bundle 18 can transmit the modulated interconnect signals as light intensities to other corresponding similar neural network processing elements.

The switching action of the neural network processing element may be accomplished by direct illumination of the photosensitive component of beam controller 6. In FIG. 9, the input signal array 2 may consist of a collection of optical fibers that originate from various other neural network processing elements. The light beams transmitted by the individual fibers are summed via an appropriate optical summing means 4, for example, a fiber optic coupler. The total light level after summation illuminates the photosensitive component of beam controller 6.

The temporal nature of the laser beam control is best described with reference to FIG. 10, where the end neuron n of the illustrated network is shown with synaptic inputs $S_{i,n}$ from other interconnected neurons. These inputs are summed, with the result used to drive beam controller 6.

The output of controller 6 acts on laser 8 to either set the laser power proportional to the summed inputs in one implementation, or to temporally modulate the laser beam at a rate proportional to the summed synapse in a second embodiment, using a transfer conversion selection option chosen at 7.

Figure 10:
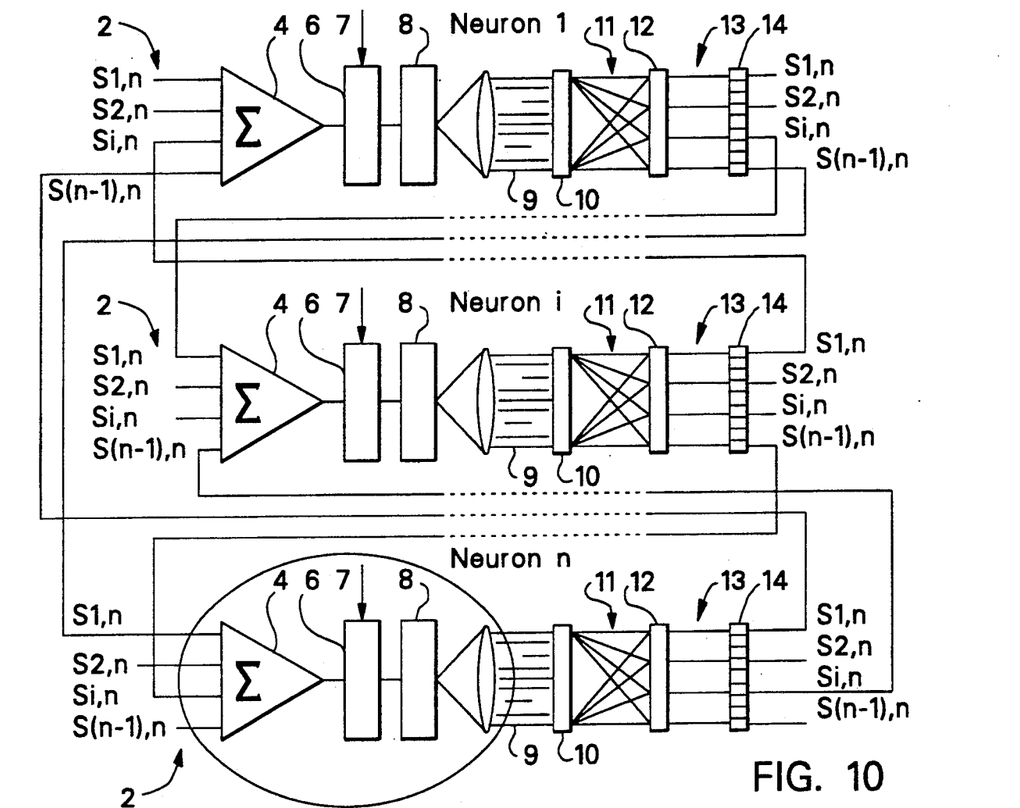
FIG. 10 shows how a plurality of inventive neural network processing elements can be incorporated into an optoelectronic configuration.
Figure 11A:
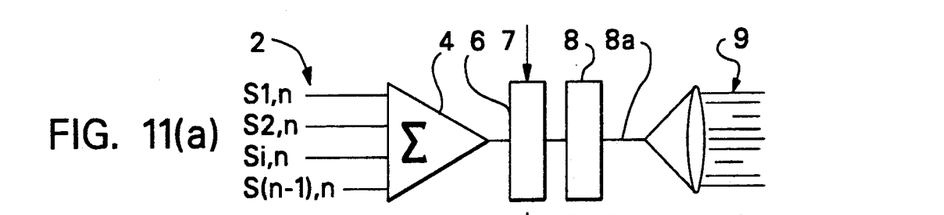
FIG. 11a shows an inventive neural network processing element in an arrangement for proportional power modulation.
Figure 11B:
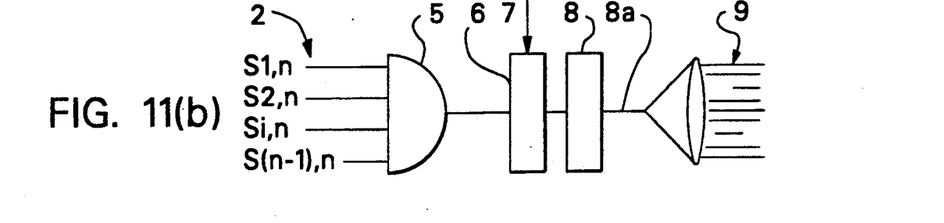
FIG. 11b shows an inventive neural network processing element in an arrangement for temporal modulation with delay-multiply.

Referring now to FIG. 11, the neuron response element of FIG. 10 is shown expanded for proportional power modulation and temporal modulation with delay-multiply operations. The proportional power modulation (FIG. 11a) uses the sum of inputs (known as dendrites) to obtain a controlling signal for the laser which is expressed by $$S_S = S_{1,n} + S_{2,n} + \ldots + S_{i,n}. \tag{A}$$

This quantity is a voltage which is then converted by transfer control to a current that drives the laser to obtain laser power output sigmoid response. This response is present at the output at 9, and is the simulation of the neuron response to the summed dendrites of equation (A).

For temporal modulation with delay-multiply, in which the frequency of the signal that amplitude-modulates the laser carrier is controlled, each neuron fires at a rate proportional to the time average of the dendrites that appear at 2 at different rates. FIG. 11b shows these inputs entering a gate 5 instead of a summer 4 as in FIG. 11a. In effect, the gate is performing a logic multiply on the incoming dendrite 2 as follows:

$$S_{corr.} = S_{1,n} S_{2,n} \ldots S_{i,n}. \tag{B}$$

Since the dendrites have a fixed amplitude, which may be taken as unity, their modulation information is contained in their firing rate. These temporally periodic functions are then ANDed as per equation (B), producing the output $S_{corr}$. The $S_{corr}$ is then time averaged by the transfer control 6 to obtain $$1/T[S_{corr.}] = 1/T\,[S_{1,n}\, S_{2,n} \ldots S_{i,n}]. \tag{C}$$

Equation (C) is used to control the frequency of an oscillator, which then serves to modulate the laser carrier providing the output 9. Here, the transfer curve follows a sigmoid function, with the output variable being the frequency of the amplitude-modulating signal. The frequency of the modulator can be written as $$f_m = K[1/T[S_{corr.}]], \quad (D)$$

where K is the sigmoid function.

If the unmodulated laser power is $P_L$, then the amplitude-modulated laser beam $p_L$ at 9 can be written:

$$p_L = [\cos w_m t + 1]P_L, \quad (E)$$

where $w_m = 2\pi f_m$.

Equations (D) and (E) show how the time-averaged dendrite input controls the firing rate of the neuron response element.

Figure 12:
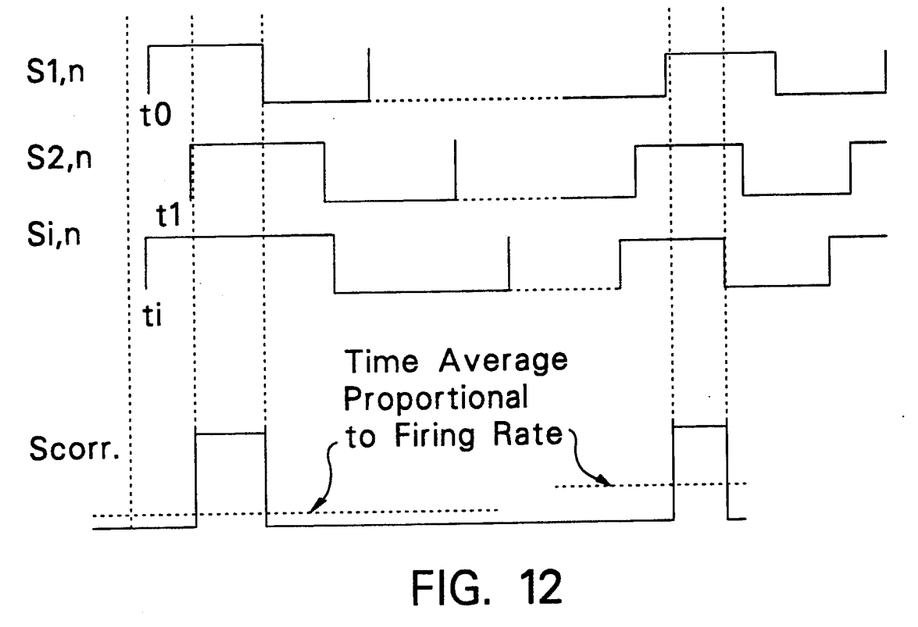
FIG. 12 shows a timing diagram of the correlation of input timing of a dendrite and its proportional firing rate.

FIG. 12 shows the timing relationships between the input dendrite and this firing rate control. The quantities $S_{1,n}$ through $S_{i,n}$ are dendrites from the neuron axons N1 through Ni going to the nth neuron. The amplitude of these waveforms is unity, and each has a corresponding time delay of $t_0$, $t_1$ and $t_i$. The vertical dashed lines show the region where the dendrites temporally coincide, which is also the region where the delay-multiply operation occurs. The output is $S_{corr.}$, which was given by equation (B). The horizontal dashed lines indicate some time later when the firing rates of the neurons may have changed, and so the time average of $S_{corr.}$ would also change. Averaging over an interval of T for $S_{corr.}$ provides the controlling function to the modulating oscillator.

This modulated laser beam is then input to multiple holographic lens 10 as shown in FIG. 10, producing an array of transform points on spatial light modulator 12, which points are transmitted through spatial light modulator 12 and exit with a phase and amplitude pattern controlled by its optical or electrical address. U.S. Pat. Nos. 4,771,397 and 4,771,398 to Brandstetter et al., assigned to the present assignee, disclose suitable systems for carrying out such phase and amplitude equalization; their disclosures are hereby incorporated by reference. The array of point beams is then imaged onto a corresponding photodetector array 14, which converts the optical point beams to electrical signals $S_{n,i}$, etc., as shown in FIG. 10.

Various modifications to the invention described in the foregoing disclosure will become readily apparent to one of ordinary skill in the art. All such modifications that basically rely upon the teachings through which the invention has furthered the state of the art are properly considered within the spirit and scope of the invention.

We claim:

1. An optical neural network processing element comprising:
    source means for forming an input coherent light beam;
    multiple holographic lens means for receiving said input light beam and outputting a light beam array;
    modulation means for spatially modulating the output array of said multiple holographic lens means, and for temporally modulating the output array by varying a magnitude of light beams in the array over time; and
    photodetector means for receiving and converting the optical output of said modulation means into electrical signals representative of said modulated output.

2. An output neural network processing element as claimed in claim 1, wherein said source means comprises:
    a laser beam source;
    summing means for summing signals input to said neural network processing element to produce a summed output signal; and
    beam controller means arranged to receive said summed signal and to modulate the output of said laser beam source in accordance with said summed signal.

3. An optical neural network processing element as claimed in claim 2, further comprising means for electrically controlling said beam controller means.

4. An optical neural network processing element as claimed in claim 2, further comprising means for optically controlling said beam controller means.

5. An optical neural network processing element as claimed in claim 2, wherein said signals input to said neural network processing element are optical signals.

6. An optical neural network processing element as claimed in claim 2, wherein said beam controller means comprises means for temporally modulating said laser beam source output.

7. An optical neural network processing element as claimed in claim 2, wherein said beam controller means comprises a Fabry-Perot interferometer for modulating said laser beam source output by controlling relative mirror spacing of said Fabry-Perot interferometer.

8. An optical neural network processing element as claimed in claim 2, wherein said beam controller means comprises a Michelson interferometer for modulating said laser beam source output by translating at least one mirror of said Michelson interferometer.

9. An optical neural network processing element as claimed in claim 1, wherein said multiple holographic lens means establishes a place of sharp focus and excludes extraneous light beams that do not form part of said output array of said multiple holographic lens means.

10. An optical neural network processing element as claimed in claim 1, further comprising a laser diode array for receiving said electrical signals output from said photodetector means.

11. An optical neural network processing element comprising:
    source means for forming an input coherent light beam;
    multiple holographic lens means for receiving said input light beam and outputting a light beam array;
    modulation means for spatially modulating the output array of said multiple holographic lens means, and for temporally modulating the output array by varying a polarization of light beams in the array over time; and
    photodetector means for receiving and converting the optical output of said modulation means into electrical signals representative of said modulated output.

12. An optical neural network processing element as claimed in claim 11, wherein said multiple holographic lens means establishes a plane of sharp focus and excludes extraneous light beams that do not form part of said output array of said multiple holographic lens means.

13. An optical neural network processing element as claimed in claim 11, further comprising a laser diode array for receiving said electrical signals output from said photodetector means.

14. An optical neural network processing element as claimed in claim 11, wherein said source means comprises:
   a laser beam source;
   a summing means for summing signals input to said neural network processing element to produce a summed output signal; and
   beam controller means arranged to receive said summed signal and to modulate the output of said laser beam source in accordance with said summed signal.

15. An optical neural network processing element as claimed in claim 11, further comprising means for electrically controlling said beam controller means.

16. An optical neural network processing element as claimed in claim 11, further comprising means for optically controlling said beam controller means.

17. An optical neural network processing element as claimed in claim 11, wherein said signals input to said neural network processing element are optical signals.

18. An optical neural network processing element as claimed in claim 11, wherein said beam controller means comprises means for temporally modulating said laser beam source output.

19. An optical neural network processing element as claimed in claim 11, wherein said beam controller means comprises a Fabry-Perot interferometer for modulating said laser beam source output by controlling relative mirror spacing of said Fabry-Perot interferometer.

20. An optical neural network processing element as claimed in claim 11, wherein said beam controller means comprises a Michelson interferometer for modulating said laser beam source output by translating at least one mirror of said Michelson interferometer.

21. An optical neural network processing element comprising:
   source means for forming an input coherent light beam;
   multiple holographic lens means for receiving said input light beam and outputting a light beam array;
   modulation means for spatially modulating the output array of said multiple holographic lens means, and for temporally modulating the output array by varying the phase of light beams in the array over time; and
   photodetector means for receiving and converting the optical output of said modulation means into electrical signals representative of said modulated output.

22. An optical neural network processing element as claimed in claim 21 wherein said multiple holographic lens means establishes a plane of sharp focus and excludes extraneous light beams that do not form part of said output array of said multiple holographic lens means.

23. An optical neural network processing element as claimed in claim 21, further comprising a laser diode array for receiving said electrical signals output from said photodetector means.

24. An optical neural network processing element as claimed in claim 21, wherein said source means comprises:
   a laser beam source;
   a summing means for summing signals input to said neural network processing element to produce a summed output signal; and
   beam controller means arranged to receive said summed signal and to modulate the output of said laser beam source in accordance with said summed signal.

25. An optical neural network processing element as claimed in claim 21, further comprising means for electrically controlling said beam controller means.

26. An optical neural network processing element as claimed in claim 21, further comprising means for optically controlling said beam controller means.

27. An optical neural network processing element as claimed in claim 21, wherein said signals input to said neural network processing element are optical signals.

28. An optical neural network processing element as claimed in claim 21, wherein said beam controller means comprises means for temporally modulating said laser beam source output.

29. An optical neural network processing element as claimed in claim 21, wherein said beam controller means comprises a Fabry-Perot interferometer for modulating said laser beam source output by controlling relative mirror spacing of said Fabry-Perot interferometer.

30. An optical neural network processing element as claimed in claim 21, wherein said beam controller means comprises a Michelson interferometer for modulating said laser beam source output by translating at least one mirror of said Michelson interferometer.

* * * * *